United States Patent [19]

Honma et al.

[11] Patent Number: 4,542,985

[45] Date of Patent: Sep. 24, 1985

[54] IMAGE FORMATION APPARATUS

[75] Inventors: Toshio Honma, Tokyo; Hiroaki Takeda, Kawasaki; Tadashi Suzuki, Yokohama, all of Japan

[73] Assignee: Canon Kabushiki Kaisha, Tokyo, Japan

[21] Appl. No.: 602,755

[22] Filed: Apr. 23, 1984

[30] Foreign Application Priority Data

| | | | |
|---|---|---|---|
| Apr. 26, 1983 | [JP] | Japan | 58-73232 |
| Apr. 26, 1983 | [JP] | Japan | 58-73233 |
| Apr. 26, 1983 | [JP] | Japan | 58-73234 |
| Apr. 26, 1983 | [JP] | Japan | 58-73235 |

[51] Int. Cl.$^{4}$ .......... G03B 27/72

[52] U.S. Cl. .......... 355/69; 355/14 E; 355/14 C

[58] Field of Search .......... 355/68, 69, 14 C, 14 E, 355/38, 14 R; 340/365 C; 364/518

[56] References Cited

U.S. PATENT DOCUMENTS

| | | | |
|---|---|---|---|
| 4,087,171 | 5/1978 | Yano | 355/14 E X |
| 4,332,464 | 6/1982 | Bartulis et al. | 355/14 C |

*Primary Examiner*—L. T. Hix
*Assistant Examiner*—Della J. Rutledge
*Attorney, Agent, or Firm*—Fitzpatrick, Cella, Harper & Scinto

[57] ABSTRACT

An image formation apparatus such as a copying machine has an image forming section including an optical system, an AE mode selection key for setting the automatic density adjustment mode, UP and DOWN keys for manually adjusting the density level, an interruption selection key, a control circuit including a microcomputer for setting a standard density level in the automatic density adjustment mode, and a display for displaying the selected density adjustment mode. Depression of the AE mode selection key for the first time sets the automatic density adjustment mode, and depression of this key for the second time releases the automatic density adjustment mode. The apparatus can reproduce copies of optimal quality for different types of original.

18 Claims, 9 Drawing Figures

| |
|---|
| FIG. 7A |
| FIG. 7B |

IMAGE FORMATION APPARATUS

BACKGROUND OF THE INVENTION

1. Field of the Invention

The present invention relates to an image formation apparatus such as a copying machine and, more particularly, to an apparatus which has an automatic adjustment mechanism for automatically adjusting an image density which determines the optimal image formation conditions for forming an image.

2. Description of the Prior Art

Adjustment of the density of a copying machine is conventionally performed by a selecting means, e.g., a manually operated variable stop lever which is continuously slid to select a density within the range of F1 to F9, or a key selection between "dark", "normal", "light".

When density adjustment is performed by this method for an original having a dark background, such as a newspaper, a diazo copy, or a colored paper sheet, the "fogging" phenomenon occurs. That is, when the density adjustment is performed under standard conditions, if the developing color of a copying machine is monochromatic (e.g., black), the background of the original is reproduced in the same color as the character portion, forming a solid black image. Conversely, when density adjustment is performed for an original of a light character density, such as an original written by a pencil, the characters may not be reproduced.

In order to solve this problem, in the density adjustment with the former selecting means, the density setting lever is set to select a density within the range of F8 to F9 for an original of dark background (F3 to F4 for an original of light background). In the density adjustment with the latter selecting means, the key for "light" for an original of dark background ("dark" for an original of light background) is set.

However, even in this case, the operator must copy a single original under different conditions before he can produce a reproduced image of optimal density. Thus, the number of misprinted copies is increased.

In view of this problem, a copying machine with an automatic density adjustment mechanism has been developed recently. In a copying machine of this type, the density of an original is read, and the exposure is automatically read or the developing level of the developing means is automatically adjusted.

In this case, if the background of the original is detected with high precision, the resultant density adjustment can be performed satisfactorily. However, it is generally very difficult to correctly detect the densities of backgrounds of various originals. Thus, the average density of an original is generally detected. Therefore, even if automatic density adjustment is performed, originals of all different types cannot be properly processed, and misprinting still results in. In some cases, the optimal density level set in a copying machine may be different from the desired level of a particular user. Then, manual density adjustment must still be performed even in a copying machine with an automatic density adjustment mechanism.

SUMMARY OF THE INVENTION

The present invention has been made in consideration of this and has as its object to provide an image formation apparatus which is capable of forming images of optimal densities.

It is another object of the present invention to provide an image formation apparatus having a density adjustment mechanism with improved operability.

It is still another object of the present invention to provide an improved image formation apparatus which has an automatic density adjustment mode and a manual density adjustment mode.

It is still another object of the present invention to provide an image formation apparatus which selects the automatic density adjustment mode to select a specific density level.

It is still another object of the present invention to provide an image formation apparatus which can release the automatic density adjustment mode during an image formation operation.

It is still another object of the present invention to provide an image formation apparatus which can release the automatic density adjustment mode by operation of manual density adjustment means.

It is still another object of the present invention to provide an image formation apparatus which can select the automatic density adjustment mode by selection of an interruption image formation mode.

The above and other objects of the present invention will become more apparent from the following description when taken in conjunction with the accompanying drawings.

DETAILED DESCRIPTION OF THE PREFERRED EMBODIMENTS

The preferred embodiment of the present invention will now be described with reference to the accompanying drawings.

Figure 1:
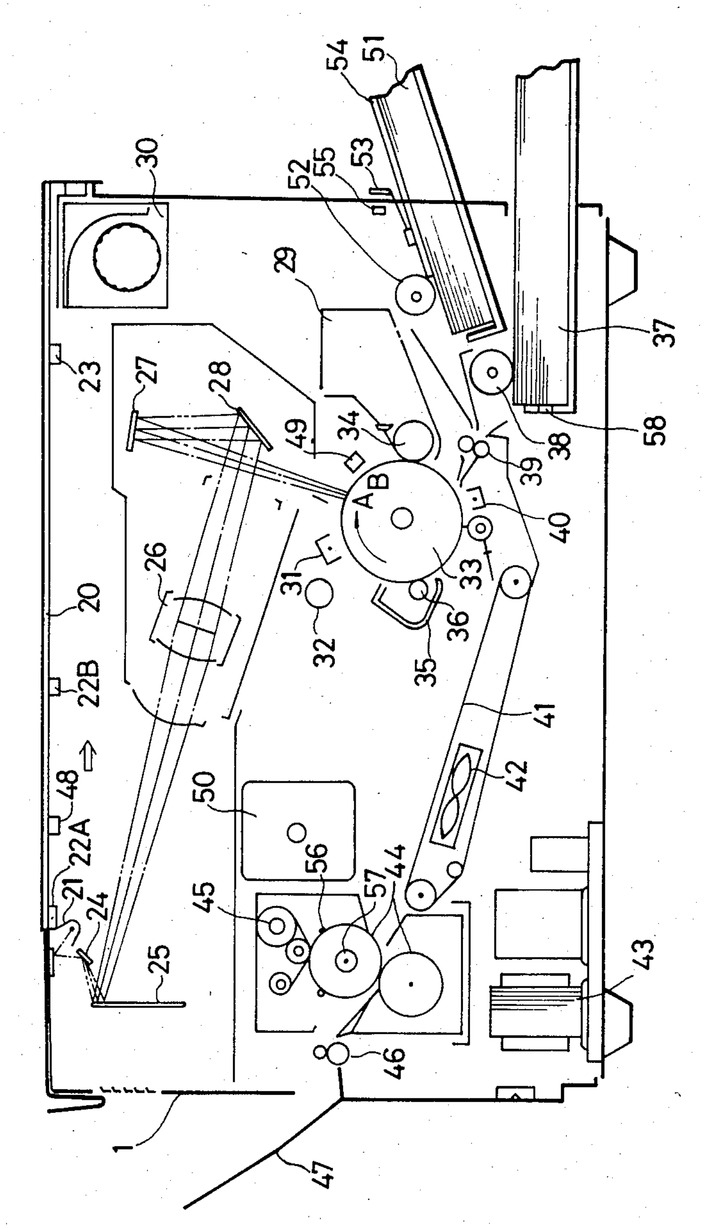
FIG. 1 is a sectional view of a copying machine to which the present invention can be applied.

FIG. 1 shows a sectional view of a copying machine to which the present invention can be applied.

A copying machine housing 1 houses different component of the copying machine therein. For example, a photosensitive drum 33 is housed in the housing 1 and rotates clockwise (indicated by arrow). A main motor 50 drives through a chain (not shown) the photosensitive drum 33, fixing rollers 44, a conveying unit 41, a pickup roller 38, and an optical system including an original illumination lamp 21. A high-voltage charger 31 charges the surface of the photosensitive drum 33. The photosensitive drum 33 is exposed and forms an electrostatic latent image at point A. Toner is applied on the image by a developing roller 34 in a developing unit 29 and is this visualized. A toner image is then transferred onto a transfer sheet by a transfer charger 40. Prior to this operation, the transfer sheet is picked up by the rotation of the pickup roller 38 from a cassette 37 at a timing such that the leading edge of the toner image coincides with that of the transfer sheet. The transfer sheet is then fed by a register roller 39. The original is illuminated with the original illumination lamp 21. The optical system including the original illumination lamp 21 scans the original in the direction indicated by the arrow, and forms an image at the point A on the photosensitive drum 33 through reflecting mirrors 24, 25, 27 and 28 and a lens 26, thereby performing exposure along the entire surface of the original. When a register sensor 48 detects the leading edge of the transfer sheet, it starts rotating the register roller 39 so that the leading edge of the image coincides with that of the transfer sheet. The register sensor 39 also generates a reference signal for AE measurement. Inversion sensors 22A and 22B are incorporated. The inversion sensor 23B is located at the optical system inversion position when cassette 37 is of a small size (e.g, B5, A4 size or the like). Another inversion sensor 23 is located at the optical system inversion position when the cassette 37 is of a large size (e.g, A3 size or the like).

Figure 2:
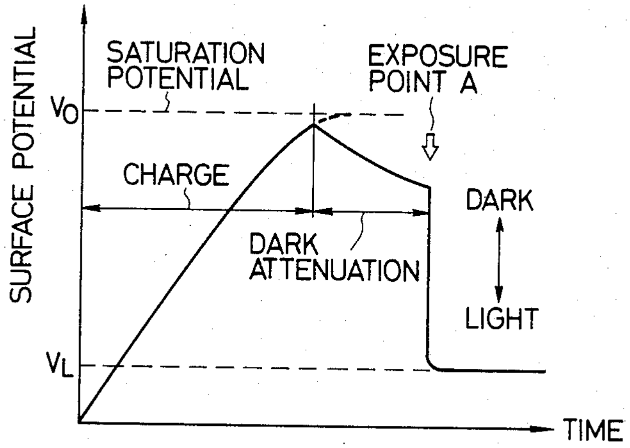
FIG. 2 is a graph showing the characteristics of a surface potential.

The photosensitive drum 33 from which the image has been transferred is cleaned by a cleaner brush 36 of a cleaner section 35 and is electrostatically cleaned by an eraser 32 for the next charging operation. Meanwhile, the transfer sheet onto which the toner image has been transferred is separated from the photosensitive drum 33 and is conveyed to the fixing unit by the conveying unit 41. The image on the transfer sheet is fixed by the fixing rollers 44 and is exhausted to an exhaust tray 47 by an exhaust roller 46. A web motor 45 winds a web for cleaning the fixing rollers 44. A power source transformer 43 is arranged at the bottom left side of the housing 1. A cooling fan 30 at the top right side of the housing 1 serves to exhaust air heated by the original illumination lamp 21. A potential sensor 49 measures the surface potential of the photosensitive drum 33. In general, the surface potential of the photosensitive drum 33 has a distribution as shown in FIG. 2. When a corona discharge is performed, the drum surface potential is charged to a potential Vo. However, the charge is dark attenuated before it reaches the exposure point A. At the exposure point A, the original is illuminated by the original illumination lamp 21 and the surface of the photosensitive drum 33 is exposed to reflected light corresponding to the original density. When the original density is light, the amount of reflected light is large. Therefore, the surface potential is decreased to a potential close to VL, as shown in FIG. 2. Conversely, when the original density is dark, the amount of reflected light is small. Thus, the density of the original can be determined by reading the surface potential of the photosensitive drum.

The control process for controlling the exposure light amount or the developing bias for obtaining an optimal reproduced image by detecting the surface state such as a surface potential of the photosensitive drum 33 and determining the original density will be referred to as AE hereinafter. The surface state is not limited to a surface potential and can be a developed image. The amount of light reflected from an original can be directly measured by a photosensor to determine the image density in the same control process. This will also be defined as AE hereinafter.

Figure 3:
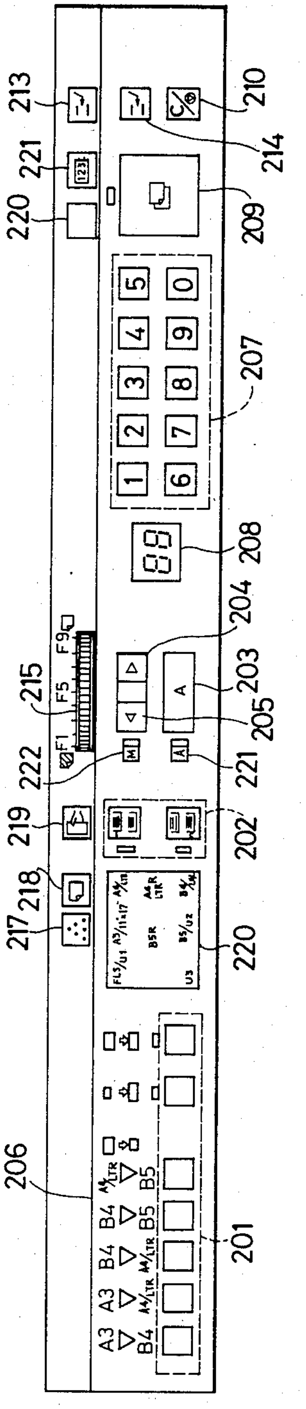
FIG. 3 is a plan view of a control section of the copying machine.

FIG. 3 is a plan view of a control section of the copying machine. A desired magnification is set by a magnification selection key 201, and the selected magnification is indicated by magnification LEDs. A cassette selection key 220 selects a cassette from two types of cassette. When an AE selection key 203 is depressed, the AE mode is set and an AE mode LED 221 is lit. The copy density can be changed in a stepwise manner by a down key 205 and an up key 204 (to be referred to as shift keys hereinafter). This sets the machine in the manual mode and a manual mode LED 222 is lit. A density indicator 215 comprises 174 LEDs having intervals corresponding to 0.5 stop in the range of F1 to F9. When the down key 205 is depressed, the density is shifted to the left by 0.5. When the up key 204 is depressed, the density is shifted to the right by 0.5. When power is supplied and the copying operation is completed, or when the AE selection key 203 is depressed, the density is indicated at the position of F5.

A copy number key 207 is depressed to set the number of copies to be reproduced, and the set copy number is displayed by a copy number display 208. When a copy start key 209 is depressed, the copy operation can be started. A clear/stop key 210 is for clearing the inputted number or stopping the copying operation. When an interruption key 214 is depressed, the interruption mode is set and an interruption indicator 213 is lit. When the interruption key 214 is depressed a second time, the interruption mode is released.

A toner lamp 217 indicates whether or not there is sufficient toner left. A paper lamp 218 indicates whether or not there is any paper sheet left. A manual feed lamp 219 indicates whether or not the manual feed mode is selected. A JAM indicator 220 indicates that jamming has occurred. A counter warning lamp 221 indicates whether or not the counter is present.

The AE control of the present invention will now be described with reference to FIG. 4 and subsequent figures.

Figure 4:
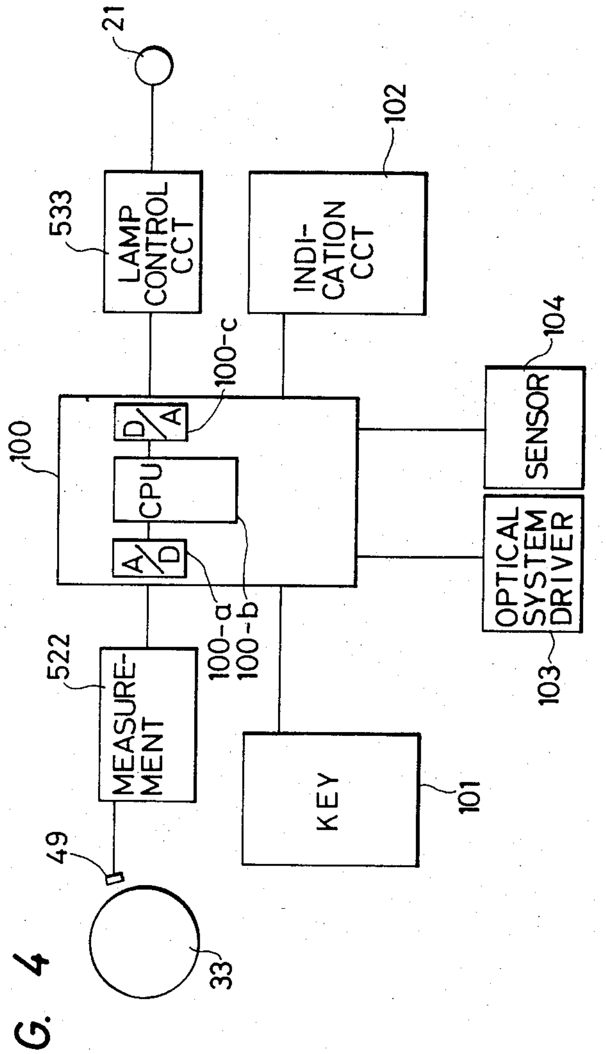
FIG. 4 is a block diagram of a control section of the copying machine.

Referring to FIG. 4, the potential sensor 49 is arranged near the photosensitive drum 33. An output from the potential sensor 49 is supplied to a potential measurement unit 522. A control circuit 100 includes a 1-chip microcomputer 100-b having a ROM and a RAM, an A/D converter 100-a, and a D/A converter 100-c. The original illumination lamp 21 is connected to a lamp control circuit 533.

The control section shown in FIG. 3 has a key group 101 and an indication circuit 102 in FIG. 4. An input entered through the key group 101 is supplied to the control circuit 100 by the general key matrix method. The indication circuit 102 turns on/off the lamps by lamp starters. An optical system driver 103 and an optical system position sensor 104 are connected to the control circuit 100.

The surface potential of the drum 33 is detected by the potential sensor 49, and is converted into a suitable analog value VA by the surface potential measurement unit 522.

The analog value VA is converted into a digital value by the A/D converter 100-a and the obtained digital value is supplied to the microcomputer 100-b. In other words, the microcomputer 100-b fetches the surface potential of the drum 33 at a desired timing. The output end of the microcomputer 100-b is connected to the D/A converter 100-c. An analog output voltage VA' from the D/A converter 100-c is supplied to a lamp control circuit 533. The lamp control circuit 533 supplies a voltage corresponding to the analog voltage VA′ to the illumination lamp 21. Then, the microcomputer 100-b sets a voltage to be supplied to the illumination lamp 21. In this manner, the exposure light amount can be set.

The optical system driver 103 connected to the control circuit 100 can reciprocally drive the optical system. The optical system position sensor 104 is also connected to the control circuit 100 and includes the sensors 48, 22A, 22B, and 23 shown in FIG. 1. The position sensor 104 produces a predetermined output corresponding to the position of the optical system. When the optical system comes to a predetermined position, it can be detected, and can therefore be stopped at a predetermined position or can be returned to the home position under the control of the control circuit 100.

An embodiment of the AE control according to the present invention will now be described below. A case will first be described wherein the selection AE key 203 is depressed to select the AE mode.

When the copy start button is depressed, the drum 33 starts to be driven, and the optical system is moved to a predetermined position. At this time, the original illumination lamp 21 is turned on by a standard voltage.

The optical system is then moved in the forward direction (prescanned). In accordance with a signal from the optical system position sensor 104, the microcomputer 100-b starts sampling the surface potential Vp of the drum 33 at a suitable timing.

In response to signals from the optical system position sensor 104, a surface potential VD is sampled a plurality of times, and an average value VDM thereof is calculated. This sampling operation is performed when the latent image corresponding to the predetermined position on the original reaches the surface potential sensor. Therefore, the average value VDM corresponding to the density at a predetermined position of the original can be obtained.

Figure 5:
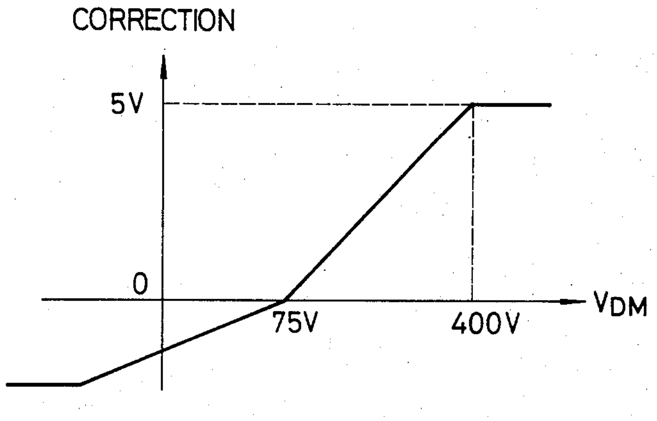
FIG. 5 is a graph showing the average value of the surface potential in an AE mode as a function of the correction value of the firing voltage of an illumination lamp.
Figure 6:
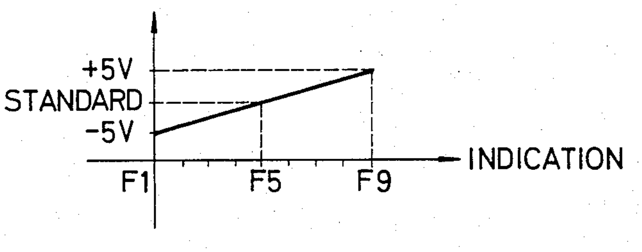
FIG. 6 is a graph showing the firing voltage of the illumination lamp as a functions of an indication.

After the optical system reaches the home position, the standard voltage value is corrected in accordance with the calculated average value VDM. The original illumination lamp 21 is turned on by the corrected firing voltage, the optical system is moved in the forward direction (scanned) and image exposure is performed. The density indicator 215 indicates the density corresponding to the corrected firing voltage. FIG. 5 shows the relationship between the average value VDM and the corrected firing voltage, and FIG. 6 shows the relationship between the firing voltage and the indication.

When VDM=75 V, that is, in the case of a standard original, the correction (corrected firing voltage) becomes zero. During the original exposure, the illumination lamp is fired at the initial preset value. The indication obtained in this case is "F5".

In the case of an original having a dark background such as a newspaper, the average value VDM becomes about 400 V. The illumination lamp in the exposure operation is turned on at +5 V, and the amount of light is increased, so that the image can be reproduced with a background of suitable level.

Since the surface potential corresponding to the original density is measured by prescanning and the firing voltage of the illumination lamp is controlled in accordance with the measured surface potential, an optical copy image can be reproduced irrespective of the type of original. The density display corresponding to the actual original density can also be obtained.

A case wherein the AE mode is not selected will now be described. In this case, when the copy start key is depressed, the drum 33 starts to be rotated and the illumination lamp 21 is turned on at a voltage set by the keys 204 and 205. Thereafter, the optical system starts moving in the forward direction to perform image exposure scanning.

Figures 7, 7A:
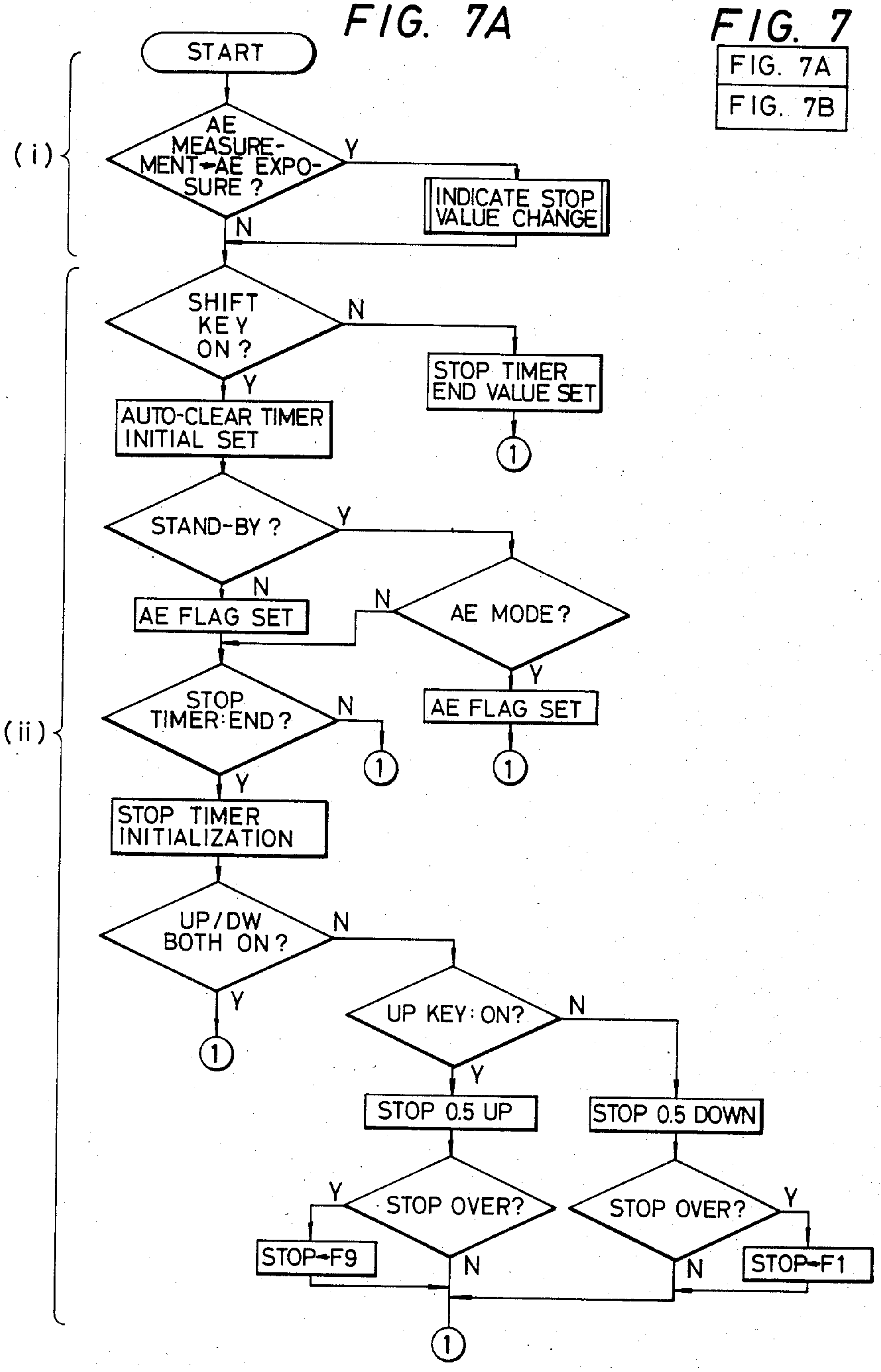
FIG. 7 composed of FIGS. 7A and 7B is a flow chart showing the control flow according to the present invention.
Figure 7B:
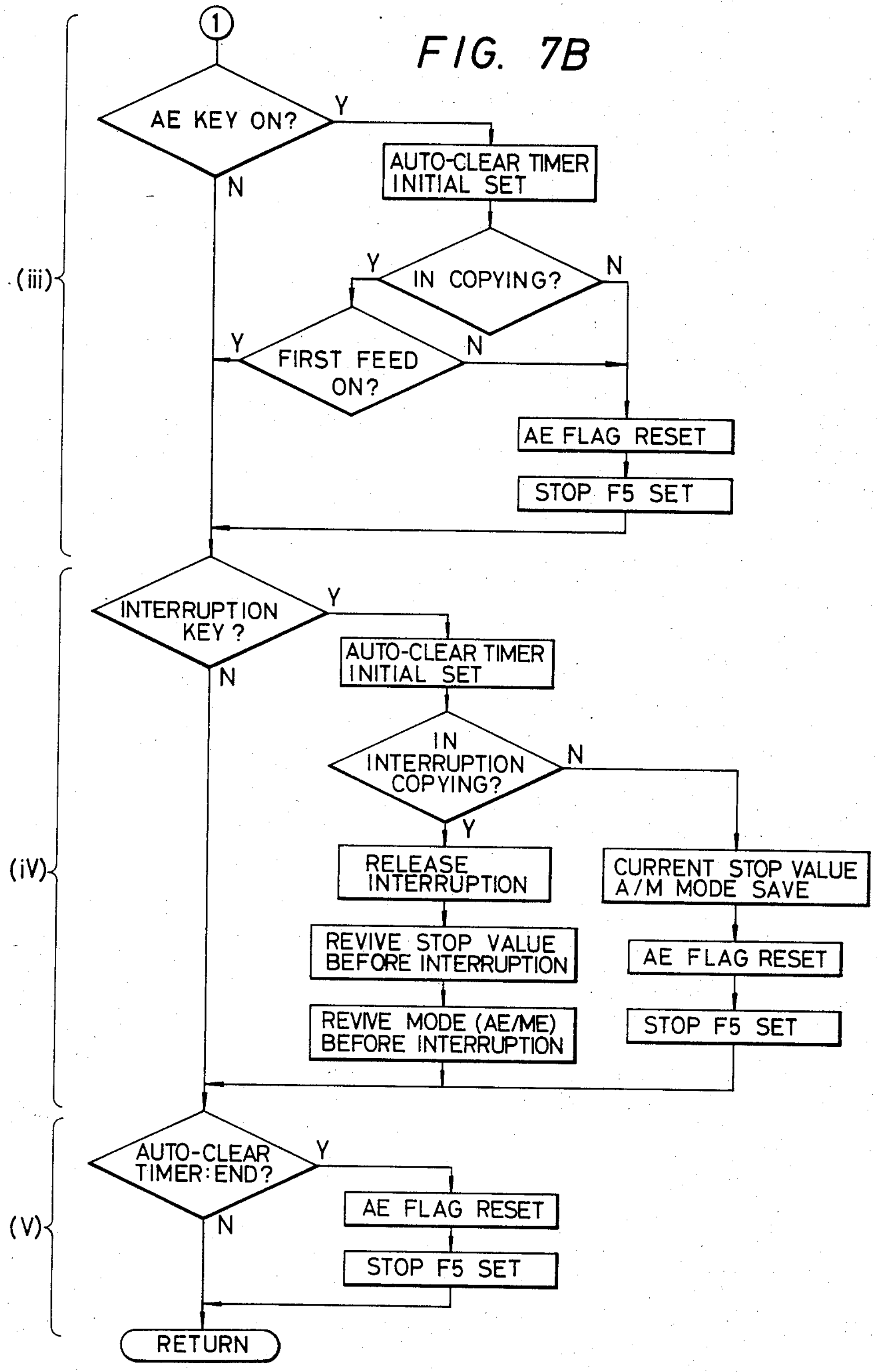

FIG. 7 shows a flow chart of the light amount setting-/display in the operation of the copying machine.

Process (i) shows the method of setting the optimal light amount by AE measurement. Process (ii) I5 shows the method of correction by means of two shift keys. Process (iii) shows the method of switching to the AE mode. Process (iv) shows the method of setting the amount of light by the interruption key. Process (v) shows the method of setting the amount of light by auto-clear (standard mode revive).

The control flow will now be described in detail.

In process (i), the setting of a stop value for obtaining an optimal amount of light in AE measurement will be described.

When the AE copy operation is performed upon depression of a copy start key, the AE correction value is calculated in accordance with a plurality of drum surface potential measurements by AE control. Thereafter, the original is illuminated with the corrected light amount (will be referred to as the AE light amount hereinafter) to start the AE copying operation.

At the same time, the stop value is calculated in accordance with the correction value, and is displayed by the density indicator 215.

Process (ii) shows the operation for setting the light amount when the shift key 204 or 205 is depressed.

When the shift key 204 or 205 is depressed during the copying operation, the AE mode is released immediately. The density is shifted by 0.5 stop to correct the exposure light amount.

In the stand-by mode, if the mode is the AE mode, an AE flag is set to set the manual mode and the stop value is not changed.

If the manual mode has already been set, a shift is performed at intervals predetermined by a stop timer.

The stop timer serves to shift the stop value by predetermined intervals when the shift key 204 or 205 is kept depressed. A basic stop time is set in the stop timer. When neither of the shift keys 204 and 205 are depressed, the stop timer is set to the end value and is shifted every time the key 204 or 205 is depressed. When the shift keys 204 and 205 are simultaneously depressed, the stop value is prevented from shifting. The upper and lower limits of the stop value are regulated by limiters to fall within the range of F1 to F9.

When neither of the shift keys 204 and 205 are depressed, the stop value is held. In process (iii), the amount of light is set by an automatic density adjustment key.

During the copying operation, a change to the AE mode by depression of the AE selection key is prohibited.

In the non-copying mode, the AE flag is reset, the mode is changed to the AE mode, and the stop indication becomes "F5".

After the copy start operation key is depressed but before the first paper sheet is fed, a change to the AE mode can be made.

When the copying operation is completed, a change to the AE mode can be made when the optical system starts returning to the home position in the copying operation for the last copy of the preset number of copies.

Process (iv) shows the operation of setting the light amount by the interruption key. When the interruption key is depressed, it is descriminated first if the interruption mode has alrrady been set. If it is determined that the general mode (non-interruption) is set, a change is made to the interruption mode. The mode selection between AE/manual and the corresponding stop value are stored in the RAM of the microcomputer 100-b.

The AE mode is thus set as the new mode (AE flag reset), and the stop indication becomes "F5" (standard light amount).

On the other hand, if it is determined that the interruption mode has already been set, when the interruption key is depressed, the interruption mode is released. Thus, the mode returns to the mode (AE/manual) which had been before the interruption mode was set.

Process (v) shows the operation for setting the light amount by auto-clear. An auto-clear timer counts up at a predetermined rate in a flow sequence portion (not shown). When a predetermined time elapses after the optical system inversion for the last copy, the auto-clear (standard mode revive) is performed. At this time, the AE flag is reset to set the AE mode, and the stop indication is shifted to "F5" (standard exposure).

As shown in each portion of the flow chart, the auto-clear timer is cleared to the initial set value when the key input and copying operation are completed. The count up of the auto-clear time is restarted for the subsequent copying operation.

When the interruption mode has been set before the auto-clear function is set, the mode is returned to the general mode and then to the AE/manual mode.

When the AE key and the up key or down key are simultaneously turned on, the up or down key has priority and is enabled.

The manual operation can be performed even if the AE key is not functioning properly.

When the up and down keys are depressed simultaneously, no key input is established.

In this manner, the release of the automatic density adjustment mode and setting of the manual density adjustment mode can be performed by a single input means. In a mode other than the copying operation of the copying machine, the automatic density adjustment mode can be released while the density level preset in this mode is held. Therefore, the automatic density adjustment mode can be released without the need for a complex operation by the operator. In the copying mode, the density can be changed quickly, thereby providing a copying machine with very good operability.

Complex procedures such as inputting the manual density adjustment a number of times or for a continuous period of time need not be performed when the automatic density adjustment mode selecting means is operated to set the standard copying density level and the copying density shift is performed for a number of stages. Thus, the operability of the copying machine is also improved in this case.

Since the correction value of the copying density is controlled by the magnitude of change in the input by the manual density adjustment means, the same density can be held after the automatic density adjustment mode is released. When fine adjustment is to be performed during continuous copying, the density of the last copying paper is continuously changed. Therefore, production of misprinted copies is reduced to the minimum.

When the AE mode is automatically selected by the interruption key to set the standard densitiy, the AE mode selection key need not be depressed. When the manual mode is desired, the standard density is set irrespective of the density before the interruption mode was selected. Therefore, in the case of standard originals (most frequent originals), the desired density can be set with ease.

The light amount of the lamp can be controlled by means of a stop or by phase control to control the power supplied to the lamp.

The section controlled in the AE mode is not limited to the lamp, and charge voltage or developing bias can also be controlled in the AE mode.

What we claim is:

1. An image formation apparatus comprising:

(a) image forming means for forming on a recording medium an image corresponding to an original image;

(b) manual setting means for manually setting a density of the image to be formed by said image forming means;

(c) detecting means for detecting an image density of the original image;

(d) density control means for controlling an operation condition of said image forming means, in a manual density adjustment mode, in accordance with the density set by said manual setting means, and in an automatic density adjustment mode, in accordance with the original image density detected by said detecting means; and (e) selecting means for selecting either one of the manual density adjustment mode or the automatic density adjustment mode, (f) wherein said density control means sets the operation condition of the image forming means to a specific condition in response to the selection of the automatic density adjustment mode by the selecting means.

2. An apparatus according to claim 1, wherein said specific condition is a standard operation condition of said image forming means.

3. An apparatus according to claim 1, further comprising display means for displaying the image forming density.

4. An image formation apparatus comprising:

(a) image forming means for forming on a recording medium an image corresponding to an original image;

(b) manual setting means for manually setting a density of the image to be formed by said image forming means;

(c) detecting means for detecting an image density of the original image;

(d) density control means for controlling an operation condition of said image forming means, in a manual density adjustment mode, in accordance with the density set by said manual setting means, and in an automatic density adjustment mode, in accordance with the original image density detected by said detecting means;

(e) selecting means for selecting either one of the manual density adjustment mode or the automatic density adjustment mode; and (f) mode control means for releasing the automatic density adjustment mode during image formation by said image forming means in accordance with the automatic mode and before the completion thereof.

5. An apparatus according to claim 4, wherein said mode control means releases the automatic density adjustment mode during image formation by said image forming means in accordance with the automatic mode and prior to the completion thereof, when said manual setting means is operated.

6. An image formation apparatus comprising:
(a) image forming means for forming on a recording medium an image corresponding to an original image;
(b) manual setting means for manually setting a density of the image to be formed by said image forming means;
(c) detecting means for detecting an image density of the original image;
(d) density control means for controlling an operation condition of said image forming means, in a manual density adjustment mode, in accordance with the density set by said manual setting means, and in an automatic density adjustment mode, in accordance with the original image density detected by said detecting means;
(e) interruption selecting means for allowing an interruption image forming operation during a predetermined image forming operation and before the completion thereof; and
(f) mode control means for selecting the automatic density adjustment mode in response to the selection of the interruption image forming operation by the interruption selecting means.

7. An apparatus according to claim 6, wherein said mode control means has storage means for storing data of the series of image forming operations when the interruption image forming operation is selected.

8. An apparatus according to claim 7, wherein the data in an image forming density level.

9. An apparatus according to claim 7, wherein the data is a density adjustment mode.

10. An apparatus according to claim 7, wherein said mode control means reads out the data from said storage means after the interruption image forming operation is completed.

11. An apparatus according to claim 6, wherein said control means selects the automatic density adjustment mode after said predetermined image forming operation is completed.

12. An image formation apparatus comprising:
(a) image forming means for forming on a recording medium an image corresponding to an original image;
(b) manual setting means for manually setting a density of the image to be formed by said image forming means;
(c) detecting means for detecting a density of the original image;
(d) density control means for controlling an operation condition of said image forming means, in a manual density adjustment mode, in accordance with the density set by said manual setting means, and in an automatic density adjustment mode, in accordance with the density of the original image detected by said detecting means; and
(e) mode control means for releasing the automatic density adjustment mode in response to the operation of said manual setting means during the automatic mode.

13. An apparatus according to claim 12, wherein when the automatic density adjustment mode is selected, the automatic density adjustment mode is released by a first input by said manual density adjusting means.

14. An apparatus according to claim 12, wherein when the automatic density adjustment mode is selected, the automatic density adjustment mode is released and the image forming density is shifted by a second input by said manual density adjusting means.

15. An apparatus according to claim 13, wherein said manual density adjusting means comprises up input means for increasing the image forming density and down input means for decreasing the image forming density, the first input being an input obtained when said up input means and said down input means are operated simultaneously.

16. An apparatus according to claim 14, wherein said manual density adjusting means comprises up input means for increasing the image forming density and down input means for decreasing the image forming density, the second input being an input obtained when one of said up input means and said down input means is operated.

17. An apparatus according to claim 1, wherein said image forming means includes exposure means for exposing the original, and said density control means controls a light quantity of said exposure means.

18. An apparatus according to claim 17, wherein said specified operation condition is one for causing the light quantity of said exposure means to be a standard light quantity.

* * * * *

UNITED STATES PATENT AND TRADEMARK OFFICE
CERTIFICATE OF CORRECTION

PATENT NO. : 4,542,985
DATED : September 24, 1985
INVENTOR(S) : TOSHIO HONMA, ET AL.

It is certified that error appears in the above-identified patent and that said Letters Patent is hereby corrected as shown below:

COLUMN 1, line 59, change "results in. In" to read --results. In--.

COLUMN 6, line 11, delete "I5"

COLUMN 7, line 5, change "descriminated" to read --discriminated--;
line 6, change "alrrady" to read --already--

COLUMN 8, line 4, change "densitiy" to read --density--.

COLUMN 9, line 35, change "in" to read --is--.

Signed and Sealed this

*Eighth* Day of *July 1986*

[SEAL]

*Attest:*

DONALD J. QUIGG

*Attesting Officer* *Commissioner of Patents and Trademarks*